US 8,799,552 B2

(12) United States Patent
Lundstrum et al.

(10) Patent No.: US 8,799,552 B2
(45) Date of Patent: *Aug. 5, 2014

(54) MICROCONTROLLER WITH SPECIAL BANKING INSTRUCTIONS

(75) Inventors: Zeke R. Lundstrum, Chandler, AZ (US); Vivien Delport, Chandler, AZ (US); Sean Steedman, Phoenix, AZ (US); Joseph Julicher, Maricopa, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 495 days.

This patent is subject to a terminal disclaimer.

(21) Appl. No.: 12/701,720

(22) Filed: Feb. 8, 2010

(65) Prior Publication Data

US 2010/0205346 A1     Aug. 12, 2010

Related U.S. Application Data

(60) Provisional application No. 61/151,754, filed on Feb. 11, 2009.

(51) Int. Cl.
*G06F 12/00* (2006.01)

(52) U.S. Cl.
USPC ............ 711/5; 711/211; 711/E12.001

(58) Field of Classification Search
None
See application file for complete search history.

(56) References Cited

U.S. PATENT DOCUMENTS

| 4,727,510 A | * | 2/1988 | Scheuneman et al. ............ 711/5 |
| 4,833,640 A | | 5/1989 | Baba ............................ 364/900 |

(Continued)

FOREIGN PATENT DOCUMENTS

| EP | 0918273 A2 | 5/1999 | ............... G06F 9/35 |
| WO | 93/10501 | 5/1993 | ............. G06F 15/20 |
| WO | 2005/043383 A1 | 5/2005 | ............... G06F 9/30 |

OTHER PUBLICATIONS

Saghir, Mazen A. R. "Application-Specific Instruction-Set Architectures for Embedded DSP Applications." Graduate Department of Electrical and Computer Engineering, University of Toronto, 1998.*

(Continued)

*Primary Examiner* — Matthew Bradley
*Assistant Examiner* — Daniel Bernard
(74) *Attorney, Agent, or Firm* — King & Spalding L.L.P.

(57) ABSTRACT

An instruction set for a microcontroller with a data memory divided into a plurality of memory banks wherein the data memory has more than one memory bank of the plurality of memory banks that form a block of linear data memory to which no special function registers are mapped, a bank select register which is not mapped to the data memory for selecting a memory bank, and with an indirect access register mapped to at least one memory bank, wherein the instruction set includes a plurality of instructions operable to directly address all memory locations within a selected bank, at least one instruction that provides access to the bank select register, and at least one instruction performing an indirect address to the data memory using the indirect access register.

23 Claims, 6 Drawing Sheets

(56) References Cited

U.S. PATENT DOCUMENTS

| | | | | |
|---|---|---|---|---|
| 5,317,706 | A | * | 5/1994 | Pechter .......................... 711/2 |
| 5,455,937 | A | * | 10/1995 | Berman et al. .................. 703/23 |
| 5,530,934 | A | * | 6/1996 | Hilton ............................. 711/5 |
| 5,579,277 | A | * | 11/1996 | Kelly ....................... 365/230.02 |
| 5,872,987 | A | * | 2/1999 | Wade et al. ..................... 712/3 |
| 6,009,019 | A | * | 12/1999 | Fang ....................... 365/189.02 |
| 6,029,241 | A | * | 2/2000 | Wojewoda et al. ............. 712/38 |
| 6,694,319 | B1 | * | 2/2004 | Schmidt ..................... 707/999.2 |
| 6,795,911 | B1 | | 9/2004 | Miyano ......................... 712/225 |
| 7,359,252 | B2 | * | 4/2008 | Suh ......................... 365/189.02 |
| 7,882,332 | B1 | * | 2/2011 | Chen et al. .................... 711/220 |
| 2002/0026545 | A1 | * | 2/2002 | Yoshida et al. ................ 710/56 |
| 2003/0058724 | A1 | * | 3/2003 | Wilson ........................ 365/222 |
| 2005/0207257 | A1 | * | 9/2005 | Skidmore ............... 365/230.01 |

OTHER PUBLICATIONS

International PCT Search Report and Written Opinion, PCT/US2010/023706, 16 pages, Mailed Oct. 8, 2010.
Wilhurst, Tim; "Designing Embedded Systems with PIC microcontrollers: Principles and Applications", XP040426011, Referex Ord; 548 pages, Oct. 24, 2006.
International Preliminary Report on Patentability, PCT/US2010/023701, 10 pages, Aug. 16, 2011.
Chinese Office Action, Application No. 201080004730.9, 7 pages, Aug. 2, 2013.
Chinese Office Action, Application No. 201080004731.3, 11 pages, Aug. 20, 2013.
Chinese Office Action, Application No. 201080004730.9, 9 pages, Apr. 1, 2014.

* cited by examiner

| | | 000 | 001 | 010 | 011 | 100 | 101 | 110 | 111 |
|---|---|---|---|---|---|---|---|---|---|
| | 00h | INDF | INDF | INDF | INDF | INDF | INDF | INDF | INDF |
| | | TMR0 | EECON | TMR0 | EECON | TMR0 | EECON | TMR0 | EECON |
| | | PCL | PCL | PCL | PCL | PCL | PCL | PCL | PCL |
| | | STATUS | STATUS | STATUS | STATUS | STATUS | STATUS | STATUS | STATUS |
| | | FSR | FSR | FSR | FSR | FSR | FSR | FSR | FSR |
| | | OSCCAL | EEDATA | OSCCAL | EEDATA | OSCCAL | EEDATA | OSCCAL | EEDATA |
| | 06h | PORTB | EEADR | PORTB | EEADR | PORTB | EEADR | PORTB | EEADR |
| | 07h | General Purpose Registers | ⇐ Addresses map back to addresses in Bank 0 | | | | | | |
| Data Memory | 0Fh | | | | | | | | |
| | 10h | General Purpose Registers | General Purpose Registers | General Purpose Registers | General Purpose Registers | General Purpose Registers | General Purpose Registers | General Purpose Registers | General Purpose Registers |
| | 1Fh | | | | | | | | |

MICROCONTROLLER WITH SPECIAL BANKING INSTRUCTIONS

CROSS-REFERENCE TO RELATED APPLICATIONS

This application claims the benefit of U.S. Provisional Application No. 61/151,754 filed on Feb. 11, 2009, entitled "LINEAR MEMORY IN A BANKED RISC MICROCONTROLLER, AND RISC MCU WITH BANKED MEMORY AND SPECIALIZED BANKING INSTRUCTIONS", which is incorporated herein in its entirety.

TECHNICAL FIELD

The present disclosure relates to integrated microcontrollers, and, more particularly to memory access of the microcontroller.

BACKGROUND

Linearly accessible data memory space requires that a large number of memory bytes, for example, random access memory (RAM) bytes, be placed contiguously and addressable in an address space. The linear memory can then be fully addressed through an address whose length depends on the size of the RAM. Microcontrollers having long instructions such as 32-bit microcontrollers or microcontrollers with multiple instruction words can easily embed such a long address within the op-code of an instruction. However, smaller architectures, for example, 8-bit architectures with efficient limited instruction length often use an instruction size of for example 10-15 bits that does not allow for storing long addresses. Even though multiple word instructions could accommodate longer addresses, this counters compact coding and therefore, such processor architectures may not be able to address a large linear address space directly. Hence, memory banking is an efficient means to provide full access to a larger memory. In memory banking, only a limited amount, i.e. a single memory bank, is made available by means of a pointer. An instruction can then contain enough bits to access all memory locations within the selected memory bank. To switch to memory locations outside a selected bank, the pointer needs to be modified.

For example, many RISC architecture microcontrollers can only access a limited amount of bytes, for example, 32 or 64 bytes of memory directly through their instructions. By using multiple banks of 32 or 64 bytes, additional memory may be accessed. Microcontrollers are generally a combination of a microprocessor or central processing unit (CPU) with peripherals and memory on a single chip. Thus, microcontrollers which use the memory banking concept further face the problem that many special function registers used, for example, for control of these peripherals and internal functions, need to be accessed by the instruction set. Thus, these special function registers are made available by mapping them into the data memory. Because access to some special function registers is critical while executing a program, in many microcontrollers some of these special function registers need to be available all the time. For example, if special function registers are only accessible through the memory, the special function register used for selecting a memory bank needs to be accessible all the time or otherwise, a user would be stuck in a memory bank that does not make this register available. To accommodate this, in many microcontrollers, data memory mapping places a minimum number of such Special Function Registers (SFR) in each bank of the memory. However, this renders the data memory non-contiguous because the non-mapped memory blocks are separated by the memory-mapped registers.

SUMMARY

Hence, a microcontroller with a banked memory is needed, that also provides for a linear memory space that is larger than a memory bank.

According to an embodiment, an instruction set for a microcontroller may comprise a data memory divided into a plurality of memory banks wherein the data memory comprises more than one memory bank of the plurality of memory banks that form a block of linear data memory to which no special function registers are mapped, a bank select register which is not mapped to the data memory for selecting a memory bank, and an indirect access register mapped to at least one memory bank, the instruction set comprising:

a plurality of instructions operable to directly address all memory locations within a selected bank;

at least one instruction that provides access to the bank select register;

at least one instruction performing an indirect address to the data memory using the indirect access register.

According to a further embodiment, the at least one instruction providing access to the bank select register may write a literal to the bank select register. According to a further embodiment, another instruction providing access to the bank select register may read the content of the bank select register. According to a further embodiment, another instruction providing access to the bank select register may perform an arithmetic or logical function to a content of the bank select register. According to a further embodiment, the plurality of instructions operable to directly address all memory locations within a selected bank may be used to access special function registers that are memory mapped to less than the plurality of memory banks. According to a further embodiment, the data memory may comprise n memory banks and special function registers may be mapped only to the first m memory banks of the n memory banks wherein m<n. According to a further embodiment, n=8 and m=4. According to a further embodiment, an even memory bank of the m memory banks each may contain a first set of memory mapped special function registers and an odd memory bank of the m memory banks each may contain a second set of memory mapped special function registers that is different from the first set. According to a further embodiment, the at least one instruction performing an indirect address to the data memory using the indirect access register can be one of the plurality of instructions operable to directly address all memory locations within a selected bank, wherein the selected address points to a special function register. According to a further embodiment, the special function register can be a virtual register. According to a further embodiment, the at least one instruction performing an indirect address to the data memory using the indirect access register may have a specific op-code for performing indirect addressing. According to a further embodiment, the microcontroller can be an 8-bit microcontroller using 12-bit instruction words.

According to yet another embodiment, a method for executing instructions in a microcontroller comprising a data memory, wherein the data memory is divided into a plurality of memory banks, may comprise the steps of:

providing access to special function registers only via memory mapping, wherein an indirect addressing register is mapped to at least one memory bank;

providing a plurality of memory banks within the memory without register mapping thereby forming a linear memory block;
providing a non-memory mapped bank select register;
decoding instructions;
if a decoded instruction identifies a write access to the bank select register:
writing a literal contained in the instruction into the bank select register, wherein the content of the bank select register selects one of the plurality of memory banks;
if a decoded instruction includes a direct address:
selecting a memory bank by the bank select register, and addressing the selected memory bank by an address provided by an instruction register;
and if a decoded instruction identifies indirect addressing:
using an address provided by the memory-mapped indirect addressing register.

According to a further embodiment, if a decoded instruction identifies a read access to the bank select register, the method may comprise the step of:—reading a literal contained in the bank select register. According to a further embodiment, if a decoded instruction identifies an arithmetic or logical function to be performed to the bank select register, the method may comprise the steps of:—reading a literal contained in the bank select register,—performing an arithmetic or logical function to the literal, and—writing the literal to the bank select register. According to a further embodiment, instructions operable to directly address all memory locations within a selected bank can be used to access special function registers that are memory mapped to less than the plurality of memory banks. According to a further embodiment, the data memory may comprise n memory banks and special function registers can be mapped only to the first m memory banks of the n memory banks wherein m<n. According to a further embodiment, n=8 and m=4. According to a further embodiment, an even memory bank of the m memory banks each may contain a first set of memory mapped special function registers and an odd memory bank of the m memory banks each may contain a second set of memory mapped special function registers that is different from the first set. According to a further embodiment, indirect addressing to the data memory can be performed by executing an instruction that performs a read or write to a specific special function register. According to a further embodiment, the special function register can be a virtual register. According to a further embodiment, indirect addressing to the data memory can be performed by executing an instruction that performs a read or write to a specific special function register.

DETAILED DESCRIPTION

According to the teachings of this disclosure, a non-memory mapped bank select register (BSR) is provided for selecting one of a plurality of memory banks used for direct addressing. A memory mapped register is used for indirect addressing independent from the selected memory bank. The addition of a specialized banking instruction, for example, "Move Literal to BSR Register (MOVLB)" allows all of the data bytes in a bank of memory to be used for general purpose data and therefore allows contiguous addressing across a plurality of the memory banks that do not contain any mapped special function registers. Hence, the BSR register that selects the active memory bank is not mapped in the data register, but may be accessible with a specialized command.

Thus, a plurality of memory banks are available that do not have or require special registers therein. This allows adjacent banks of the memory to be indirectly addressed via an indirect addressing register (FSR) without concern or need for special function registers (SFR) in each memory bank. This allows addressing of larger blocks of memory, for example, for use as buffers, tables, scratch pad areas, etc. Any functions using a data structure larger than the banked memory size may be thus implemented.

Figure 1:
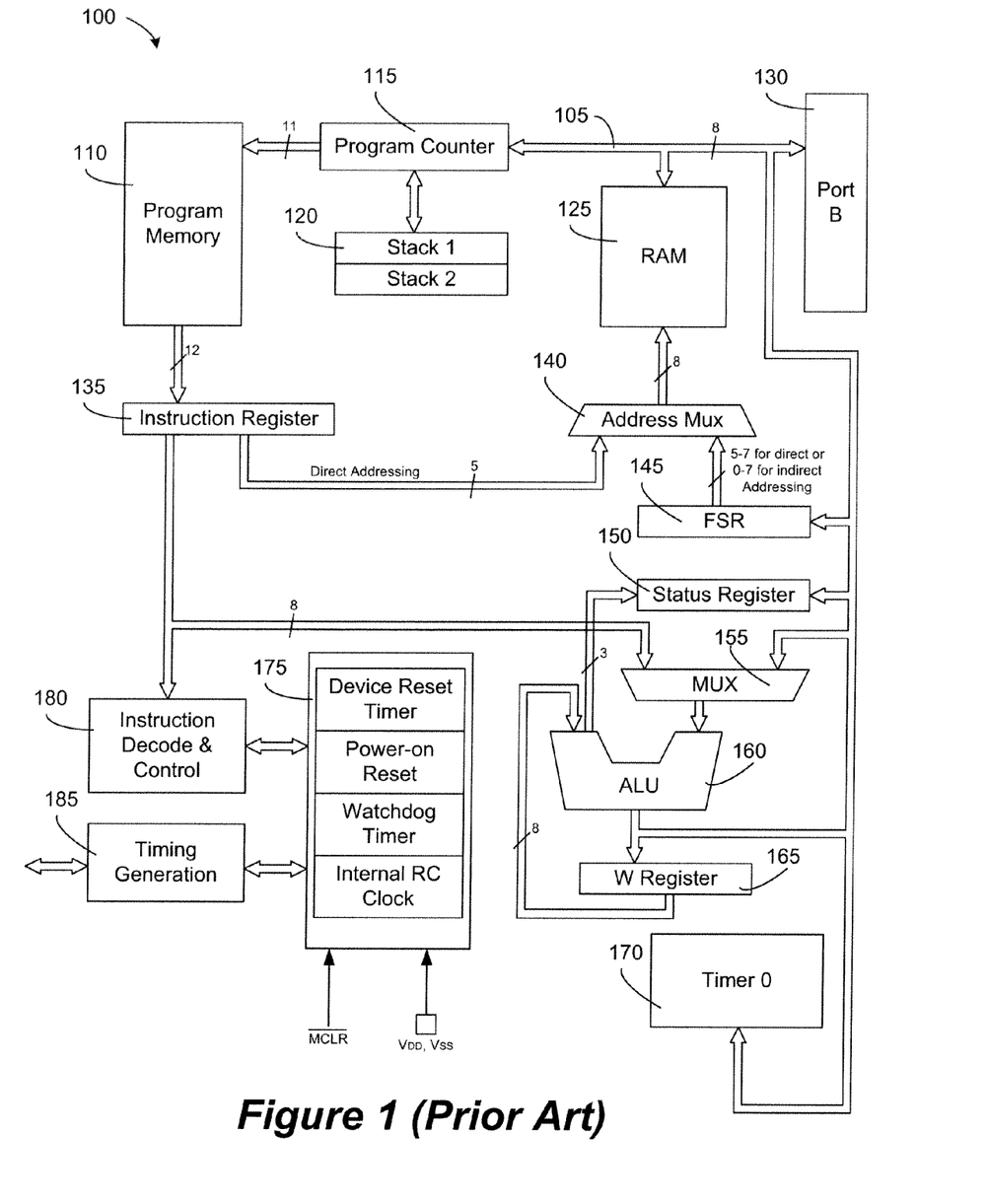
FIG. 1 shows a block diagram of a conventional microcontroller.

FIG. 1, shows a simplified block diagram of conventional microcontroller with a data memory that can be accessed with a banking mechanism. A program memory 110 stores a plurality of instructions forming an executable program. Program counter 115 may be designed to have for example 11 bits for addressing a 2 k linear program memory. A stack 120 may be provided to store program counter values when subroutines are executed. The shown exemplary microcontroller is an 8-bit Harvard-type microcontroller that operates with 12-bit instruction words stored in program memory 110. Thus, a central 8-bit data bus 105 may be used to couple various functional elements within the microcontroller, such as for example timer unit 0 and external port B 130. The data memory 125 is coupled with this bus 105 and receives for example an 8-bit address from address multiplexer 140. For direct addressing, address multiplexer 140 combines an address from address data supplied by the instruction register 135 and address data supplied by special function register 145. In direct addressing mode, the instruction register 135, thus, supplies the lower 5 bits and the special function register 145 the upper 3 bits. Thus, according to an embodiment, special function register 145 operates as a bank select register capable of selecting one of 8 different memory banks. In indirect addressing, special function register 145 provides for a complete address with all bits 0-7. Indirect addressing is implemented by accessing special function register INDF which is a virtual register and therefore not a physical register. Any read or write access to this register INDF forces that an indirect access is applied to the data memory 125 via special function register 145, thus, instead of reading or writing register INDF, an indirect data memory access is performed.

According to various embodiments, instruction register 135 receives an instruction directly from program memory 110 and is coupled with an instruction decode & control unit 180, for example, through another internal 8 bit bus. Instruction decode & control unit 180 is furthermore coupled with certain internal function provided by unit 175. For example, this functional unit 175 may include a device reset timer, a power-on reset, a watchdog timer, an internal RC clock, etc. Other functions can be integrated and/or certain functions may be omitted. Timing generation unit 185 may provide for internal timing signals and can also be coupled with unit 175. The conventional 8-bit microcontroller core shown in FIG. 1 has an arithmetic logic unit 160 (ALU) coupled with a status register 150. The ALU 160 is further coupled with a working register 165 and receives data from the instruction register 135 and the 8-bit data bus through multiplexer 155 on one hand and on the other hand from working register 165. FIG. 1, thus, merely shows some essential structures of a microcontroller core. Other internal structures are possible and can be combined with the specific embodiments shown in FIG. 2 as will be explained in more detail below.

Figure 2:
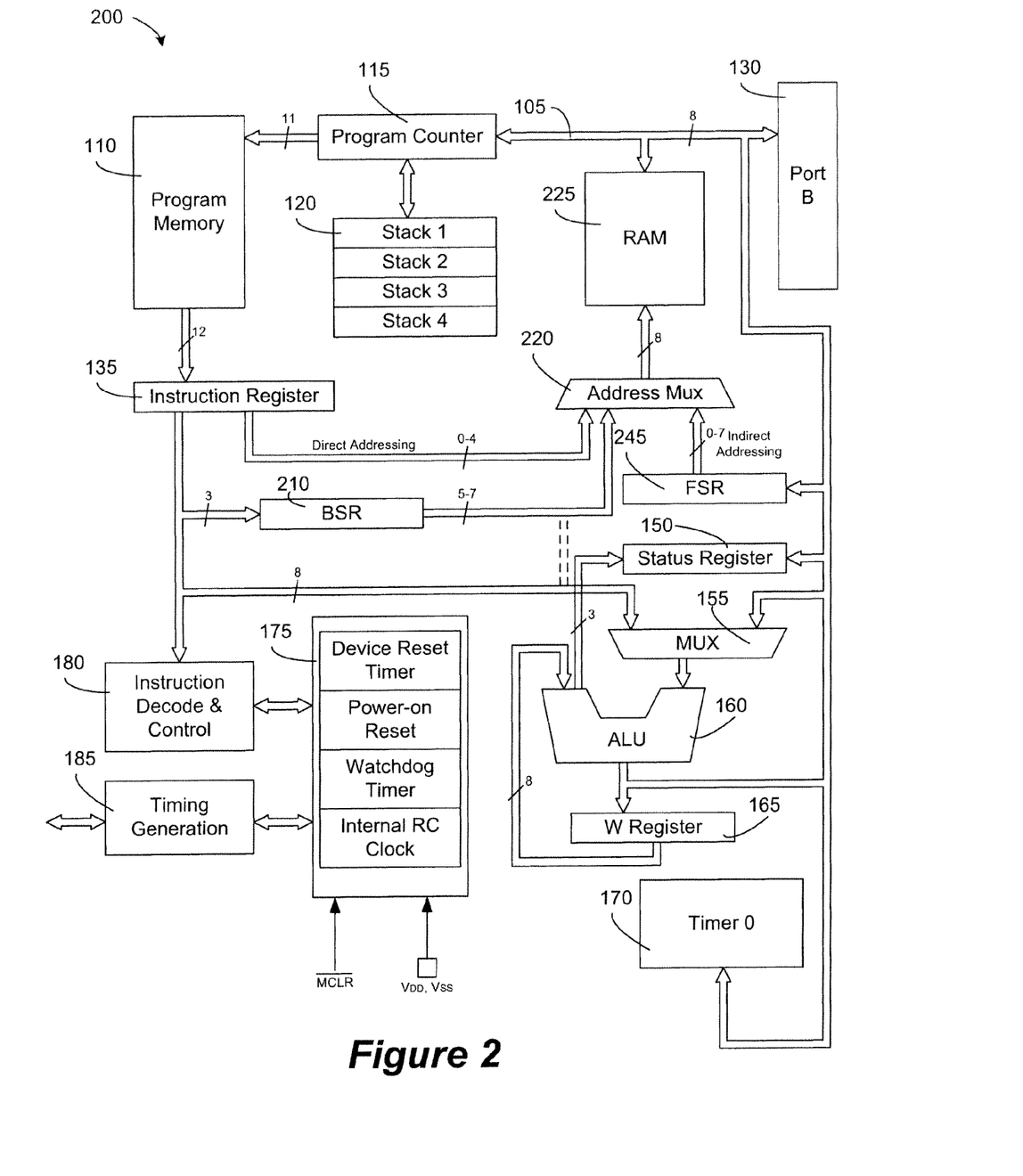
FIG. 2 shows a block diagram of an exemplary microcontroller according to an embodiment.
Figure 3:
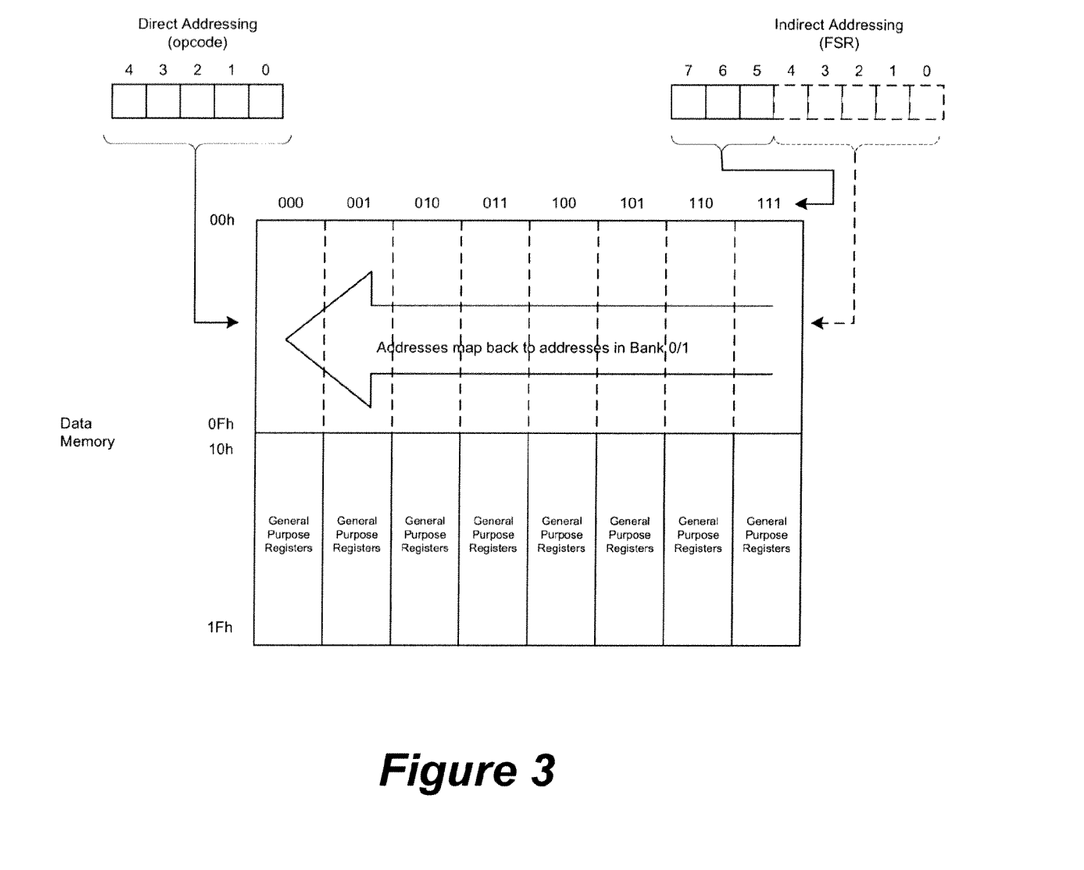
FIG. 3 is a block diagram showing a conventional banked memory.

FIG. 3 shows the structure and mapping of data memory 125 in a conventional microcontroller. As mentioned above, because at least some special function register must be available all the time, the first 16 data bytes in address 00h-0Fh of all memory banks contain the values of 16 special function registers. These special function registers may be physically detached from the memory. However, a mapping architecture maps these 16 special function registers to all memory banks. In the embodiment shown in FIG. 2, every memory bank contains the same special function registers in addresses 00h-0Fh. However, as some special function registers are less critical, they may be accessed only in every other bank. Thus, more than 16 special function registers can be mapped into the first 16 addresses. For example, all even banks and all odd banks have the same mapping structure, respectively.

Figure 4:
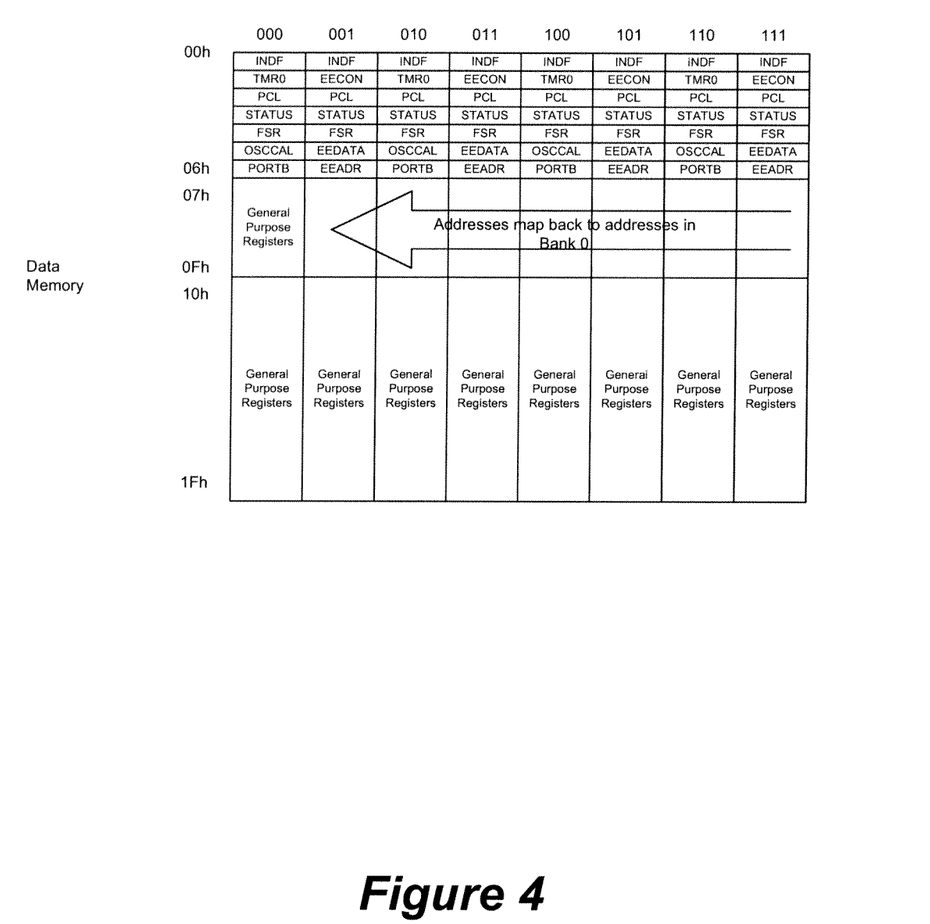
FIG. 4 shows an exemplary mapping in which even and odd banks each contain a different set of special function registers.

FIG. 4 shows an exemplary mapping in which even and odd banks each contain a different set of special function registers. For example, all even banks may have the following special function registers mapped to addresses 00h-06h:

INDF—if accessed, FSR is used to address data memory indirectly.
TMR0—Timer 0 module register
PCL—stores the low order bits of the program counter
STATUS—contains typical status bits of the CPU
FSR—bank select register, contains 3 bits to select one of eight memory pages
OSCCAL—oscillator calibration register
PORTB—Port B register The following registers can be mapped to addresses 00h-06h of all odd memory banks:

00h—INDF—if accessed, FSR is used to address data memory indirectly.
01h—EECON—configuration bits for flash memory
02h—PCL—stores the low order bits of the program counter
03h—STATUS—contains typical status bits of the CPU
04h—FSR—bank select register, contains 3 bits to select a memory page
05h—EEDATA—self write data register for flash memory
06h—EEADR—self write address for flash memory The remaining addresses 07h-0Fh are all the same for even and odd memory banks. As shown in FIG. 3, the upper addresses 10h-1Fh of each bank comprise individual general purpose registers. However, they form individual small memory blocks and do not form one linear block of memory. Thus, if, for example, a table is larger than the maximum size of general purpose registers in one bank, the table must be distributed to more than one bank and cumbersome programming is necessary to access such a table.

FIG. 2 shows an exemplary embodiment of a microcontroller that overcomes such a limitation. Generally, similar elements carry the same reference symbol. The data memory RAM 225 shown in FIG. 2 can be identical to the memory as shown in FIG. 1. However, a different reference symbol is used to indicate that this RAM 225 is differently mapped as will be explained below in more detail. This data memory now comprises a linear memory block consisting of a plurality of sequential memory banks to which no special function registers are mapped. An additional bank select register (BSR) 210 is provided wherein this register is accessible through a dedicated instruction and therefore not memory mapped. The content of this register 210 provides for the upper 3 bits of an address provided by address multiplexer 220 which receives the lower 5 bits from instruction register 135. The special function register FSR 145 may now be an 8-bit register which can be used for indirect addressing of the entire linear data memory independent of the currently selected memory bank. In other embodiments, this register can be limited to access the upper 4 banks that form the linear data memory by setting bit 7 permanently to "1". However, this register does not provide for the bank select function per se anymore. Bank selection is effected only by writing a respective bank number into the non-memory mapped bank select register 210. Thus, even when a memory bank within the linear memory block is selected, the dedicated instruction allows for change to any other memory bank.

Figure 5:
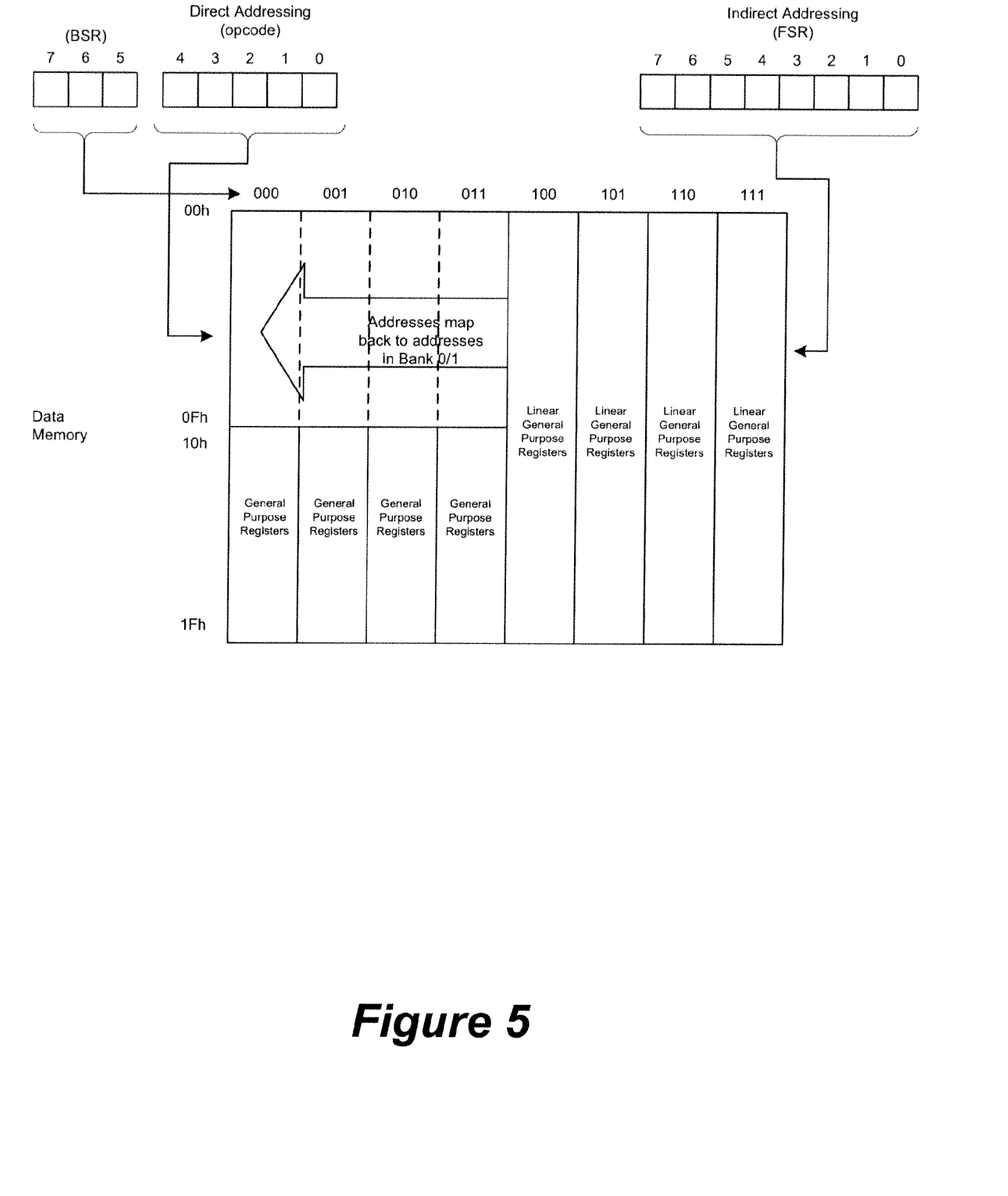
FIG. 5 shows a memory mapping according to an embodiment.

FIG. 5 shows an embodiment of how the special function registers may be mapped to the data memory 225. In this embodiment, only the lower four banks are used to provide access to the special function registers whereas the upper four banks now provide for a linear contiguous data memory space. FIG. 4 also shows how direct and indirect addressing is performed. Here, non-memory mapped register BSR 210 provides for the banks select information, thereby providing the address multiplexer 220 with the upper three address bits. The instruction register provides for the lower 5 address bits. Multiplexer 220 combines these two address data portions to form a 8-bit address used to address data memory 225. More or less bits may be used to form an address in other embodiments. If bank select register 210 selects one of the lower four memory banks, then all addresses 00h-0Fh may be mapped back to bank 0 or alternately to bank 0 or bank 1 as will be explained in more detail in FIG. 6. As mentioned above, the upper four memory banks have no special function registers mapped to them and thus form a contiguous linear data memory. This linear memory block may still be accessed through direct addressing using bank select register 210 and the address information provided in the instruction op-code. However, direct addressing is limited to be performed only within the currently selected bank. Thus, the linear memory block can alternatively be accessed indirectly through special function register FSR 245 which can now store an 8-bit address capable of fully addressing the data memory 225 independent from the selected memory bank. Hence, for example a table, scratch pad, or buffer with, for example 128 entries can be simply accessed through indirect addressing. Access to the entire data memory by means of this special function register 245 can be performed through a special instruction or if no such instruction is implemented through read or write access to a special function register INDF as explained above.

Due to the fact that bank select register 210 is not memory mapped, as mentioned above a special op-code is reserved to perform read and write function with respect to this register. One or more dedicated instructions provide access directly to the non-memory mapped bank select register 210. For example, a single instruction "Move Literal to BSR Register" (MOVLB) may be used to transfer data into bank select register 210. The usable bits of bank select register 210 depend on the number of memory banks into which the data memory is divided. In the example shown in FIGS. 5 and 6, the data memory is divided into eight memory banks, each bank having 32 bytes. Thus, this embodiment provides for 256 data memory bytes wherein the upper four banks provide for 128 bytes forming a linear memory block that is not interrupted by mapped special function registers.

The instruction MOVLB when decoded provides for direct access to the bank select register and, for example, writes a literal directly into register 210 wherein for example, only the lower 3 bits of the literal are transferred. Other coding may be used and more than one instruction may be available to read and/or write to the bank select register 210. In other implementations more memory banks may be provided and bank select register 210 may have more than 3 bits to be able to address all banks. Other additional dedicated instructions can be provided for. For example, a read instruction, or any type of arithmetic or logical modification instructions, such as, increment and, decrement, masking, or Boolean function may be provided for. To this end, an additional coupling of the special function register 210 with ALU 160 may be provided as indicated by the dotted line in FIG. 2.

Figure 6:
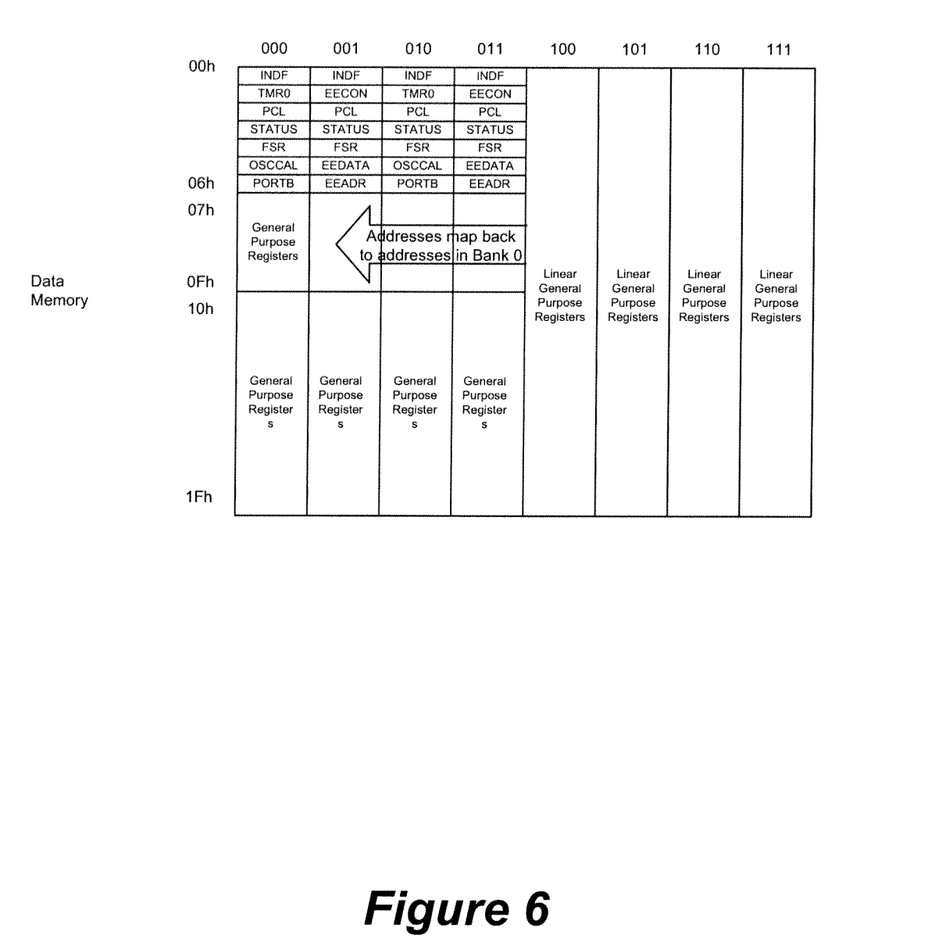
FIG. 6 shows an exemplary mapping for a 256 byte data memory according to an embodiment.

FIG. 6 shows an exemplary mapping for a 256 byte data memory in which banks 0 and 2 each contain a different set of special function registers than banks 1 and 3. For example, the following special function registers can be mapped to addresses 00h-06h of banks 0 and 2:

00h—INDF—if accessed, FSR is used to address data memory indirectly.
01h—TMR0—Timer 0 module register
02h—PCL—stores the low order bits of the program counter
03h—STATUS—contains typical status bits of the CPU
04h—FSR—bank select register, contains 3 bits to select a memory page
05h—OSCCAL—oscillator calibration register
06h—PORTB—Port B register The following registers can be mapped to addresses 00h-06h of banks 1 and 3:

00h—INDF—if accessed, FSR is used to address data memory indirectly.
01h—EECON—configuration bits for flash memory
02h—PCL—stores the low order bits of the program counter
03h—STATUS—contains typical status bits of the CPU
04h—FSR—bank select register, contains 3 bits to select a memory page
05h—EEDATA—self write data register for flash memory
06h—EEADR—self write address for flash memory The selection of which special function register is mapped to the lower four banks depends on the specific implementation and may vary. Also, the number of memory banks can be smaller or larger as well as the number of banks used to form the linear memory block.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A microcontroller comprising a data memory divided into a plurality of memory banks wherein special function registers are memory-mapped to more than one memory bank of said plurality of memory banks and wherein said data memory comprises more than one memory bank of said plurality of memory banks that form a block of linear data memory to which no special function registers are mapped, a bank select register which is not mapped to said data memory for selecting a memory bank, and an indirect access register mapped to more than one memory bank, wherein the bank select register is the only register for memory bank selection, the microcontroller being furthermore configured to comprise an instruction set comprising:
   a plurality of instructions operable to directly address all memory locations within a selected bank;
   at least one instruction that provides access to said bank select register;
   at least one instruction performing an indirect address to said data memory using said indirect access register.

2. The microcontroller according to claim 1, wherein the at least one instruction performing an indirect address to said data memory using said indirect access register has a specific op-code for performing indirect addressing.

3. The microcontroller according to claim 1, wherein the microcontroller is an 8-bit microcontroller using 12-bit instruction words.

4. The microcontroller according to claim 1, wherein the at least one instruction performing an indirect access to said data memory using said indirect access register is one of said plurality of instructions operable to directly address all memory locations within a selected bank, wherein the selected address points to a special function register.

5. The microcontroller according to claim 4, wherein the special function register is a virtual register.

6. The microcontroller according to claim 1, wherein said at least one instruction providing access to said bank select register writes a literal to said bank select register.

7. The microcontroller according to claim 6, wherein another instruction providing access to said bank select register reads the content of said bank select register.

8. The microcontroller according to claim 6, wherein another instruction providing access to said bank select register performs an arithmetic or logical function to a content of said bank select register.

9. The microcontroller according to claim 1, wherein said plurality of instructions operable to directly address all memory locations within a selected bank are used to access special function registers that are memory mapped to more than one memory bank of said plurality of memory banks.

10. The microcontroller according to claim 9, wherein said data memory comprises n memory banks and special function registers are mapped only to the first m memory banks of said n memory banks wherein m<n.

11. The microcontroller according to claim 10, wherein n=8 and m=4.

12. The microcontroller according to claim 10, wherein an even memory bank of the m memory banks each contains a first set of memory mapped special function registers and an odd memory hank of the m memory banks each contains a second set of memory mapped special function registers that is different from said first set.

13. A method for executing instructions in a microcontroller comprising a data memory, wherein the data memory is divided into a plurality of memory banks, wherein said data memory can be accessed via direct and indirect addressing and wherein a direct address can only be formed by a first partial address provided by a single bank select register in combination with a partial direct address supplied by an instruction register, the method comprising the steps of:
   providing access to special function registers only via memory mapping, wherein an indirect addressing register is mapped to more than one memory bank;
   providing a plurality of memory banks within said memory without register mapping thereby forming a linear memory block;
   providing a non-memory mapped bank select register;
   decoding instructions;

if a decoded instruction identifies a write access to the bank select register:
  writing a literal contained in said instruction into said bank select register, wherein the content of said bank select register selects one of said plurality of memory banks;
if a decoded instruction includes a direct address:
  selecting a memory bank by said bank select register, and
  addressing said selected memory bank by an address provided by an instruction register;
and if a decoded instruction identifies indirect addressing:
  using an address provided by said memory-mapped indirect addressing register.

14. The method according to claim 13, wherein indirect addressing to said data memory is performed by executing an instruction that performs a read or write to a specific special function register.

15. The method according to claim 14, wherein the special function register is a virtual register.

16. The method according to claim 13, wherein if a decoded instruction identifies a read access to the bank select register: reading a literal contained in said bank select register.

17. The method according to claim 13, wherein if a decoded instruction identifies an arithmetic or logical function to be performed to the bank select register:
  reading a literal contained in said bank select register,
  performing an arithmetic or logical function to said literal, and
  writing said literal to said bank select register.

18. The method according to claim 13, wherein instructions operable to directly address all memory locations within a selected bank are used to access special function registers that are memory mapped to more than one memory bank of said plurality of memory banks.

19. The method according to claim 18, wherein said data memory comprises memory banks and special function registers are mapped only to the first m memory banks of said n memory banks wherein m<n.

20. The method according to claim 19, wherein n=8 and m=4.

21. The method according to claim 19, wherein an even memory bank of the m memory banks each contains a first set of memory mapped special function registers and an odd memory bank of the m memory banks each contains a second set of memory mapped special function registers that is different from said first set.

22. The method according to claim 21, wherein indirect addressing to said data memory is performed by executing an instruction that performs a read or write to a specific special function register.

23. A microcontroller comprising a data memory divided into a plurality of memory banks wherein special function registers are memory-mapped to more than one memory bank of said plurality of memory banks and wherein said data memory comprises more than one memory bank of said plurality of memory banks that form a block of linear data memory to which no special function registers are mapped, a data memory address multiplexer which can select a data memory address or an indirect data memory address, a bank select register which is not mapped to said data memory for selecting a memory bank, and an indirect access register mapped to more than one memory bank, wherein the a direct memory address can only be formed by said bank select register in combination with a partial direct address supplied by an instruction register, the microcontroller being furthermore configured to comprise an instruction set comprising:
  a plurality of instructions operable to directly address all memory locations within a selected bank;
  at least one instruction that provides access to said bank select register; and
  at least one instruction performing an indirect address to said data memory using said indirect access register.

* * * * *

UNITED STATES PATENT AND TRADEMARK OFFICE
CERTIFICATE OF CORRECTION

PATENT NO. : 8,799,552 B2
APPLICATION NO. : 12/701720
DATED : August 5, 2014
INVENTOR(S) : Zeke R. Lundstrum et al.

It is certified that error appears in the above-identified patent and that said Letters Patent is hereby corrected as shown below:

In the Claims

Column 8,
Claim 12, line 49 "...odd memory hank of the m memory banks each contains a..."
---Change to--- "...odd memory bank of the m memory banks each contains a..."

Signed and Sealed this
Twenty-first Day of October, 2014

Michelle K. Lee
*Deputy Director of the United States Patent and Trademark Office*